United States Patent [19]

Kuck

[11] Patent Number: 4,691,305
[45] Date of Patent: Sep. 1, 1987

[54] AUTOMATIC ATTENUATOR FOR SONOBUOYS

[75] Inventor: John H. Kuck, Silver Spring, Md.

[73] Assignee: The United States of America as represented by the Secretary of the Air force, Washington, D.C.

[21] Appl. No.: 772,814

[22] Filed: Sep. 5, 1985

[51] Int. Cl.⁴ .................................. H04B 11/00
[52] U.S. Cl. .................................. 367/3; 367/5
[58] Field of Search ............... 367/3, 4, 5, 118, 128

[56] References Cited

U.S. PATENT DOCUMENTS

| | | | |
|---|---|---|---|
| 3,341,810 | 9/1967 | Wallen | 340/16 |
| 3,461,421 | 8/1969 | Stover | 340/2 |
| 3,725,855 | 4/1973 | Murphree | 340/6 R |
| 4,322,828 | 3/1982 | Hoff | 367/118 |
| 4,451,909 | 5/1984 | Kodera | 367/99 |

OTHER PUBLICATIONS

Caron, "Surface Impact Location System" *Proc. of Ocean'72, Inter. Con. on Engineering in the Ocean Environment*, Sep. 1972, pp. 462–467.

U.S. patent application Ser. No. 666,784 filed Oct. 31, 1984 by Edwin Westerfield.
U.S. patent application Ser. No. 377,214 filed May 11,1982 by Richard Lane.

Primary Examiner—Richard A. Farley
Attorney, Agent, or Firm—William G. Auton; Donald J. Singer

[57] ABSTRACT

An automatic attenuator for use in Sonobuoy Missile Impact Location System (SMILS) sonobuoys to separate re-entry which impact signatures from other acoustic phenomena is disclosed. The attenuator for the sonobuoy device is divided into a high gain, narrow band channel for detection of ping signals and a low gain, wide band channel for detection of impact signals. The output of the two channels are summed in a summing amplifier. A switch is provided to turn off the high gain channel whenever received signals are large enough to cause a comparator circuit to activate a time which turns off the switch for 15 seconds time. Thus, the stronger impact signals are distinguished from other random signals.

10 Claims, 2 Drawing Figures

4,691,305

AUTOMATIC ATTENUATOR FOR SONOBUOYS

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to the use of Global Positioning System (GPS) sonobuoys to determine the location of re-entry vehicle (RV) impacts, and specifically to an automatic attenuator which helps distinguish between acoustic location signals and the leading-edge of the impact signals of (RVs).

The Soviet Union uses operational launch control centers to test launch their inter continental ballistic missile systems (ICBM's). The United States test launches its ICBM's from Vandenberg AFB, California where missiles are launched into the South Pacific near the Kwajalein Missile Range or one of several broad ocean area (BOA) target areas. Although the missiles have their own internal navigation systems, one of the purposes of the test launches is to determine the accuracy of the missile systems.

The task of accurately determining the impact points of RVs in the ocean at the time of splashdown is alleviated, to some degree, by the following references, which are incorporated herein by reference:

U.S. Pat. No. 3,461,421 issued to H. Stover on Aug. 12, 1968;

U.S. Patent Application Ser. No. 666,784 filed on Oct. 31, 1984 by Edwin Westerfield; and U.S. Patent Application Ser. No. 377,214 filed on May 11, 1982 by Richard Lane.

The Stover reference discloses a sonobuoy system which has direction finding and range capabilities. The Westerfield and Lane references describe the use of a Global Positioning System to determine the geodetic location of a single sonobuoy in an array of sonobuoys and, in turn the determination of the splash point of re-entry vehicles.

This determination is usually made through use of the Sonobuoy Missile Impact Location System (SMILS). With this system up to 15 sonobuoys are dropped in an array in the target area. Each buoy has the ability of detecting acoustic (in water) noise generated by the splash of the re-entry body and of transmitting the re-entry data to an aircraft circling overhead. It is essential that the position of each sonobuoy be known.

To determine the location of other sonobuoys, with respect to each other, an aircraft command-actuated signal causes an acoustical pinger in each GPS sonobuoy to be activated. These GPS pings are received by the passive sonobuoys and transmitted to the aircraft via the VHF link for recording and processing. By knowing the time of GPS ping transmission and reception, as well as the speed of sound in water, the position of each passive sonobuoy can be determined by standard techniques. The speed of sound in water is obtained by measuring the ping transmission time between the GPS sonobuoys.

The GPS/SMILS system, as disclosed in the above-cited references, has been successfully used to determine the location of RV impacts in the broad ocean area (BOA). However, a variety of acoustic phenomena have been observed in the BOA which are either capable of being mistaken for an impact signal, or obscure the exact arrival time of the leading edge of the impact signal These other signals include bottom reflections, wave induced noise on the buoys, and noise spikes from unknown causes.

Static acoustic filtering is an inadequate solution to the problem. Although an impact signal has a comparatively high threshold in comparison to the other acoustic phenomena, currently employed sonobuoys still are required to detect acoustic pings to determine their location with respect to each other.

In view of the foregoing discussion, it is apparent that there currently exists the need to separate the leading edge of RV impact signals from other sonar acoustic phenomena while retaining the ability to detect GPS pings. The present invention is intended to satisfy that need.

SUMMARY OF THE INVENTION

The present invention is an automatic attenuator for use in GPS/SMILS sonobuoys to separate RV impact signatures from other acoustic phenomena. The attenuator for the sonobuoys device is divided into a high gain, narrow band channel for the detection of ping signals, and a low gain, wide band channel for the detection of impact signals. The output of the two channels are summed in a summing amplifier. Switching means are provided to turn off the high gain channel whenever received signals are large enough to cause a comparator circuit to activate a 15 second timer, the timer then switches off the high gain channel for 15 seconds. Thus, the longer impact signals are distinguished from other random signals.

It is a principal object of the present invention to increase the ability of the GPS/SMILS system to automatically determine the location of re-entry vehicle impacts.

It is another object of the present invention to separate the leading edge of impact signatures from other acoustic phenomena.

It is another object of the present invention to enable sonobuoys to distinguish acoustic phenomena from impact signatures while retaining the ability to detect GPS ping signals.

These together with other objects features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention is an automatic attenuator for use in GPS/SMILS sonobuoys to separate RV impact signatures from other acoustic phenomena.

Figure 1:
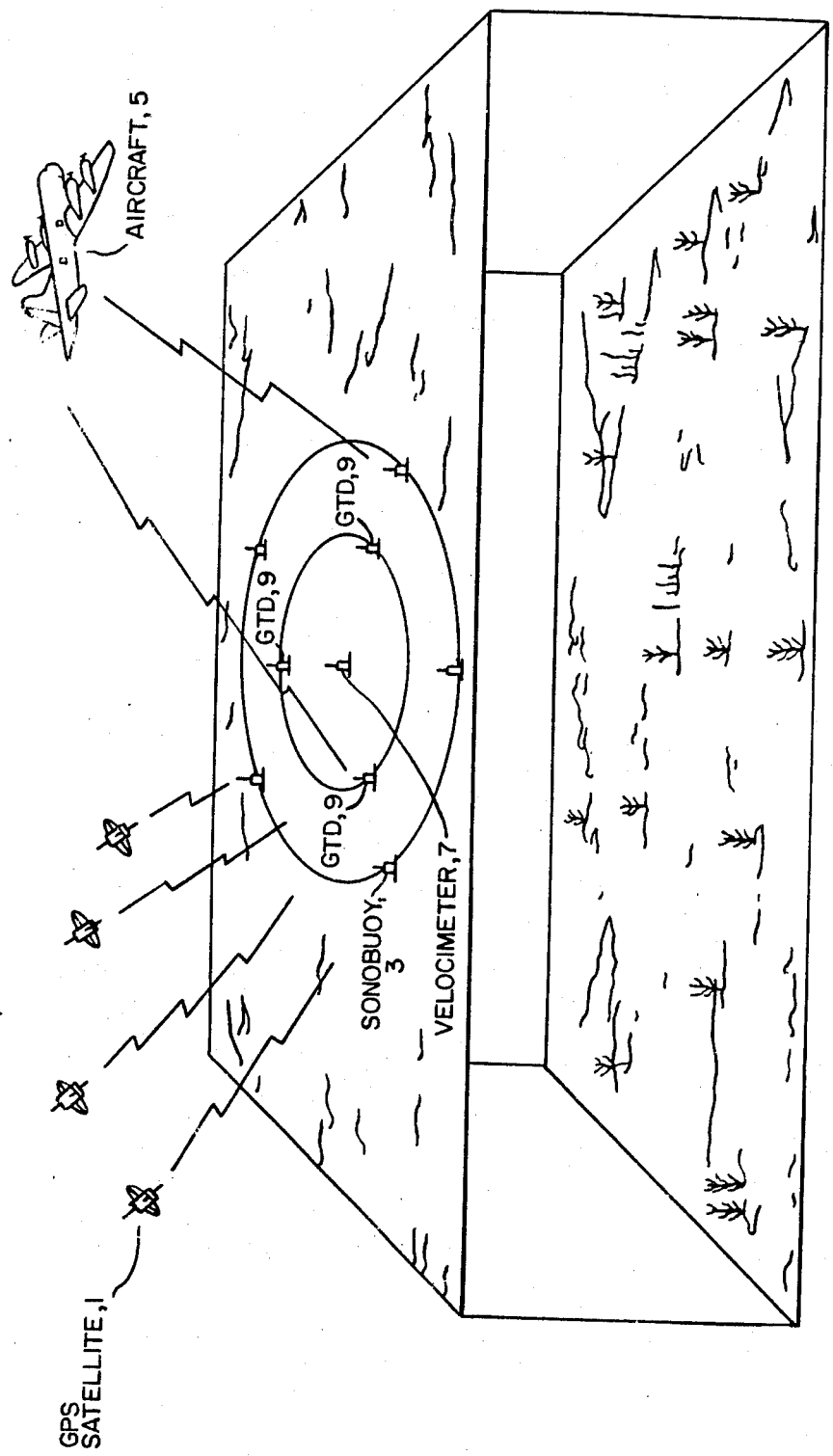
FIG. 1 is a sketch of the current use of an array of sonobuoys to detect re-entry vehicle impacts.

FIG. 1 is a sketch, from the Westerfield reference, of the current use of an array of sonobuoys in the testing of a ballistic missile system through use of a Sonobuoy Missile Impact Location System (SMILS). With this system up to 15 sonobuoys 3 are dropped in an array in the target area. Each buoy has the ability of detecting acoustic (in water) noise generated by the splash of the re-entry buoy and of transmitting the re-entry data to an aircraft 5 circling overhead.

Several different types of buoys are used in the system shown in FIG. 1. The velocimeter buoy 7 is used to measure the velocity of sound in water. A bathythermograph buoy may also be deployed to measure water temperature as function of depth.

Three of the buoys in the array are known as GPS transdigitizer buoys (GTD)9. These buoys contain: a relay that receives signals from GPS satellites 1 in view and translates them down to base band where they are one-bit quantized and sampled at a 2 megasample/sec rate. These data along with a data stream generated by digitizing the acoustic data are then used to modulate a carrier for transmission to the aircraft 5 that is circling overhead. The GTD buoy is also equipped with a command receiver for turning the transdigitizer power off and on and for commanding acoustic pings.

The prior art method of processing acoustic signals received from the hydrophones consists of little more than: amplifying the signals, converting them to digital, and transmitting them to the aircraft. Unfortunately, the process allows the leading edge of the impact signal to be obscured by other acoustic phenomena. This in turn, results in obscuring the precise impact location of the RV.

Additionally, a variety of acoustic signals are capable of being initially interpreted as impact signals. These signals include bottom reflections, wave induced noise on the buoys, and noise spikes from unknown causes. While these false alarms may be eventually weeded out in the detailed analysis of the data, false alarms can hinder the ability to quickly report the occurence of initial detections.

Sonobuoys rely upon the reception of acoustic ping signals to determine their location with respect to each other. Therefore, acoustic thresholding of all signals with amplitudes less than that of the impact signals is an approach that would eliminate GPS ping signals. Consequently, this approach is unacceptable.

Figure 2:
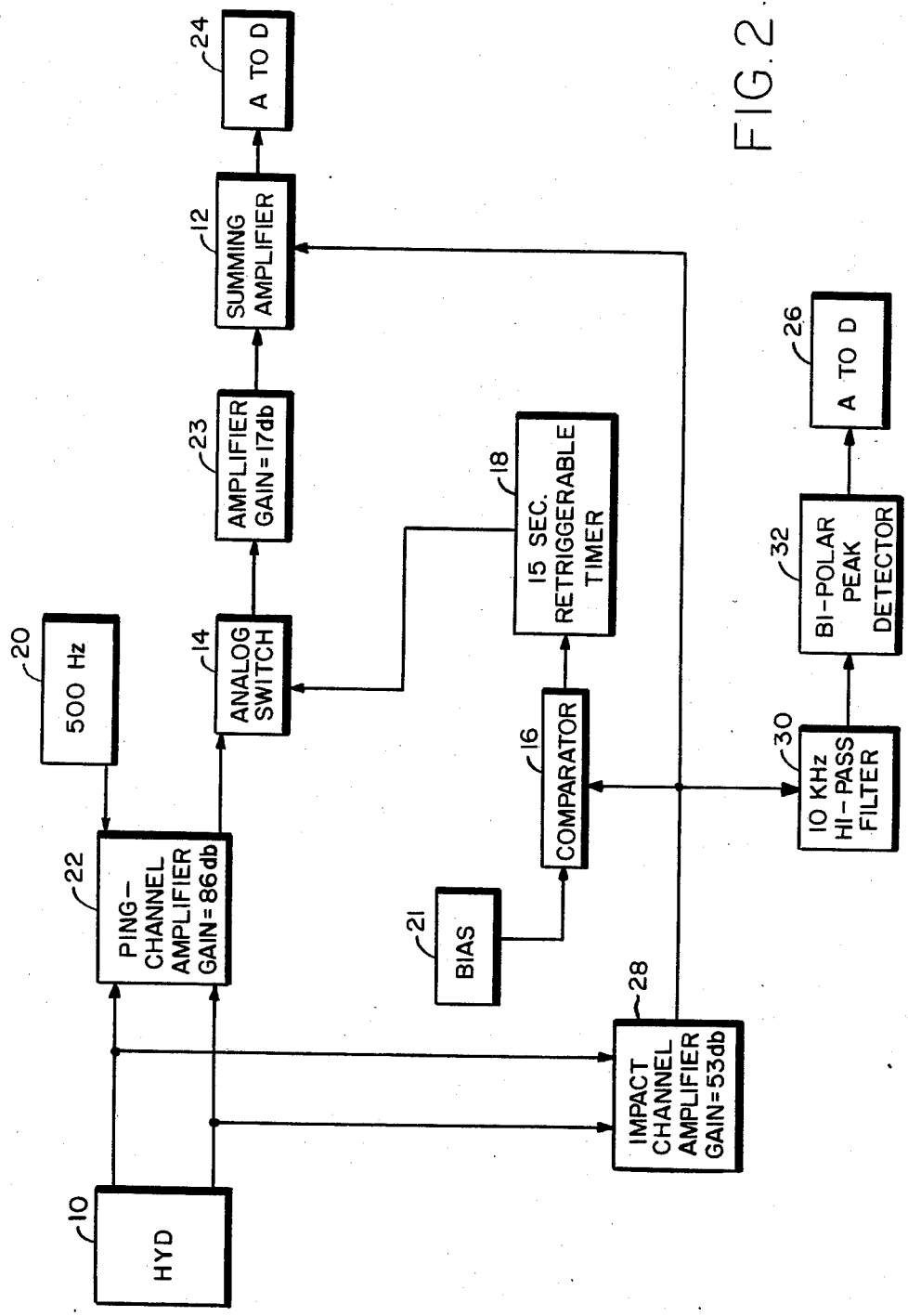
FIG. 2 is a block diagram of the preferred embodiment of the present invention.

FIG. 2 is a block diagram of the present invention which concerns an automatic attenuator for sonobuoys. This attenuator is divided into two main channels, a high-gain, relatively narrowband channel for the detection of accoustic ping signals, and a comparatively low gain, wideband channel for the detection of impact signals. The outputs of the two channels are summed by a summing amplifier 12. A switching arrangement is provided to turn off the high-gain ping-channel with analog switch 14, whenever signals occur that are large enough to cause comparator 16 to activate the switch via a 15 second retriggerable timer 18. This presumes that only the acoustic signals caused by the re-entry body impact are strong enough to activate the switch. As can be appreciated, this parameter can be adjusted if found to be in error.

In the embodiment depicted in FIG. 2, the high-narrow band signal channel contains two amplifiers 22 and 23. The electrical parameters of the first amplifier 22 are strictly tailored around the electrical characteristics of the GPS ping signals. As mentioned earlier, the positions of the sonobuoys in the array are also fixed in relative coordinates through the use of active (pinging) sonobuoys. The pinging sonobuoys transmit a 2-kH$_z$ tone once every 90 seconds. All sonobuoys receive the pings, and multilateration is used to determine the relative positions of the buoys to each other. Therefore, as shown in FIG. 2, the first amplifier has a −3 db passband around a range of frequencies from 1.5 kH$_z$ to 4 kH$_z$.

Additionally, since the GPS ping signals have a low amplitude in comparison with the RV impact acoustic signals, the first amplifier 22 applies a comparatively high gain (about 86 db) on signals received from the hydrophone. For the purpose of this invention, a high gain is defined as being about 86 db; a medium gain is defined as being about 53 db; and a low gain is defined as being around 17 db. The second amplifier 23 in this ping signal channel has a low gain of about 17 db.

A 500 Hz signal is provided by Continuous Wave (cw) oscillator 20 and coupled into ping channel amplifier 22 to serve as a switch status indicator, since it will be present in the output of summing amplifier 12 when the switch is on and absent when the switch is off. The cw signal present in the summing amplifier is chosen to be approximately 10% of the maximum output of summing amplifier 12. When detected by a remote station it is separated from the remaining signal and noise by a narrowband filter and then detected.

The second signal channel contains a medium gain amplifier 28, high-pass filter 30, and a bipolar peak detector 32. The medium gain amplifier applies only a medium gain (53 db) to acoustic signals detected from the hydrometer, and is thereby able to, to some extent, isolate the RV impact signals, which have comparatively high amplitudes.

An example source level for an RV impact is 200 db relative to 1 μ Pa$^2$ at 1 m in a 600-Hz band near 2500 Hz. In comparison, the background noise level for sea state 3 in a 600-Hz band near 2500 Hz is about 85 db relative to 1 μ Pa$^2$. At 18 km (10 nmi) the propagation loss, based on spherical spreading and frequency attenuation at 2500 Hz, is about 89 db relative to 1 m. The spherical spreading loss assumption is conservative because a surface duct will usually exist and will trap RV impact energy; the 89-db loss can easily be sustained over a distance of 36 km (20 nmi) instead of the 18 km (10 nmi) assumed above. The resulting signal-to-noise ratio (SNR) at the hydrophone is calculated by:

$$200 - 89 - 85 = 26 \text{ db}. \qquad \text{Eq. 1}$$

Thus, the signal is high enough to be easily detected without incurring undue false alarm rates from noise spikes.

The output signal of the medium gain amplifier 28 has three destinations. The first of these destinations is the 10 kH$_z$ high-pass filter 30, which sends a filtered impact signal to the bi-polar peak detector 32, which produces the output of the impact signal channel by performing a peak detection.

The second destination of the output signal from the medium gain amplifier 28 is the comparator 16 which produces an output signal as long as it receives a signal whose amplitudes exceed that of a bias signal coming in from a bias 21. The bias signal is simply a signal whose amplitude approximately equals a minimum threshold. This minimum threshold is simply an estimated value of an amplitude above which the impact acoustic signal should reach after being processed by the medium gain amplifier.

In addition to a comparatively high amplitude, RV impact acoustic signals have a comparatively long duration that distinguish them from noise spikes and other acoustic phenomena. Therefore, an adjustable timer 18 receives the signal from the comparator 16, and indirectly trigger the analog switch to interrupt the signal flow from the first amplifier 22 to the second amplifier 23 of the ping signal channel. The signal remains off for an interval of 15 seconds, unless another impact occurs during this interval. In this case, the interval is then extended 15 seconds from the time of the second impact. Subsequent impacts occurring during the off-time will further extend the off-time. Thus, the off-time exists until 15 seconds from the final impact. A retriggerable multivibrator timer 18 generates a pulse which determines the off-time interval. In the embodiment of FIG. 2 the amount of time has been set to 15 seconds based on past experience with RV impact signals. Additionally, after conclusion of the off-time interval, the timer 18 releases the switch 14, allowing reconnection of the first and second amplifiers 22 and 23 so that additional detections may be made.

The third destination of the output signal of the medium gain amplifier 28 is a summing amplifier 12, which produces a data stream 24 by combining this signal with the output of the low gain amplifier 23 of the ping signal channel. Therefore, the output of the attenuator is two data streams; one from the summing amplifier 24, one from the peak detector 32.

The prior art system of acoustic signal processing consisted of little more than; the hydrophone, an amplifier, an analog-to-digital (A/D) converter, and a radio frequency transmitter. While the analog signals from the peak detector 32 and summing amplifier 24 could be used to modulate a carrier and thus be transmitted, the present invention is best used by converting the analog outputs to digital and then using the digital equivalent signals to modulate the carrier.

The output of summing amplifier 12 will be fed to the input of an A/D converter with a 50 kHz sampling rate, indicated at 24. The impact channel branch in the attenuator feeds an output to a separate A/D converter with a 5 kHz sampling rate, indicated at 26. Filter 30 will pass only those signals that have the high rise-rate characteristic of impact signatures and the peak detector 32 has a fast enough risetime to capture these signals and store their peak amplitudes long enough for them to be sampled at a 50 kHz rate.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. In combination with a sonobuoy containing a hydrophone which detects first and second acoustic signals, said first acoustic signal having a relatively low amplitude when compared to said second acoustic signal, said sonobuoy having a radio frequency transmitter which transmits information by modulating a carrier with a first and second data stream, an automatic attenuator receiving all signals detected by said hydrophone and outputting said first acoustic signal in the form of said first data stream to said radio frequency transmitter while waiting for said second acoustic signal, said automatic attenuator conducting said second acoustic signal in the form of said first and second data streams to said radio frequency transmitter after said second acoustic signal is detected and verified while ceasing to output said first acoustic signal over said first data stream, said automatic attenuator comprising:

first and second signal channels each receiving acoustic signals from said hydrophone, said first signal channel isolating said first acoustic signal and producing an output signal by applying a high gain and narrow passband to acoustic signals received from said hydrophone;

said second signal channel isolating said second acoustic signal and producing said second data stream by applying a medium gain and peak detection to acoustic signals received from said hydrophone;

a means for summing the output signal of said first signal channel when available, with said second acoustic signal from said second signal channel, said summing means thereby producing said first data stream; and a means for switching said first signal channel off, said switching means being electrically connected to said summing means and said first and second signal channels, said switching means receiving and comparing all acoustic signals received by said second signal channel to a bias signal, said bias signal being a signal having a level relative to expected amplitudes in comparison with said second acoustic signal, said switching means switching off said first signal channel when said second acoustic signal is detected and verified so that the first data stream produced by the summing means does not contain said first acoustic signal.

2. An automatic attenuator, as defined in claim 1, wherein said second signal channel comprises:

a medium gain amplifier which produces an output signal which isolates said second acoustic signal from said hydrophone by applying a medium gain to acoustic signals received from said hydrophone, said medium gain being that which gives visibility to said second acoustic signal while suppressing the relatively low amplitude of said first acoustic signal and background noise, said medium gain amplifier sending its output signal to said switching means;

a high-pass filter which produces an output signal by filtering said output signal of said medium gain amplifier with a wide passband; and a bi-polar peak detector which produces said second data stream by performing a peak detection on the output signal received from said high-pass filter.

3. An automatic attenuator, as defined in claim 2, wherein said first signal channel comprises:

a first amplifier which receives acoustic signals from said hydrophone, and produces an output signal which isolates said first acoustic signal by applying a high gain and narrow passband to received signals, said first amplifier sending its output signal to said switching means; and a second amplifier which produces said output signal of said first signal channel by applying a comparatively low gain to signals received from said switching means, said second amplifier being electrically connected to said first amplifier by said switching means and receiving the output signal of said first amplifier when said switching means is switched on, and receiving nothing when said switching means switches said first signal channel off.

4. An automatic attenuator, as defined in claim 3, wherein said summing means comprises a summing amplifier which produces said first data stream by summing the output signals of said second amplifier, when they are available, with the output signal of the medium gain amplifier in said second signal channel.

5. An automatic attenuator, as defined in claim 4, wherein said first signal channel includes a means for generating a status signal, said generating means outputting said status signal to said first amplifier so that it is included in the first data stream produced by said summing means when said first signal channel is switched on by said switching means, and said status signal is absent from said first data stream when said first signal channel is switched off by said switching means.

6. An automatic attenuator, as defined in claim 5, wherein said switching means comprises:
- a means for generating a bias signal, said bias signal having an amplitude approximately equalling a minimum amplitude that said second acoustic signal is expected to have after being received by said hydrophone and processed by said medium gain amplifier;
- a means for comparing said bias signal received from said generating means, with said second acoustic signal, received from said medium gain amplifier, said comparing means producing an output signal which indicates that said acoustic signal has an amplitude which exceeds said bias sginal;
- a timer, which begins and continues timing to a preset time when receiving said output signal from said comparator which indicates that the amplitude of said second acoustic signal exceeds that of said bias signal, said timer outputting a switch, signal until completing its count; and
- a switch which normally conducts the output signals from said first amplifier, in said first signal channel, to said second amplifier, said switch interrupting signals from said first amplifier when receiving said switch signal from said timer.

7. An automatic attenuator, as defined in claim 6, wherein said first amplifier in said first signal channel comprises an amplifier with a gain of about 86 db and provides a $-3$ db passband to filter out signals outside the range of about 1.5 kHz to 4 kHz, said first amplifier thereby providing high gain to said first acoustic signal, which has a frequency of about 2.0 kHz.

8. An automatic attenuator, as defined in claim 7, wherein said generating means is an oscillator which produces a signal having a frequency of about 500 Hz, said generating means thereby producing said status signal which is given a gain of $-3$ db by said first amplifier so that said status signal does not obscure said first acoustic signal.

9. An automatic attenuator, as defined in claim 8, wherein said second amplifier in said first signal channel comprises an amplifier which has a gain of about 17 db.

10. An automatic attenuator, as defined in claim 9, wherein said medium gain amplifier in said second signal channel comprises an amplifier having a gain of about 53 db.

* * * * *